H. C. EGERTON.
FRICTION DRIVING DEVICE.
APPLICATION FILED OCT. 15, 1918.
1,422,550.
Patented July 11, 1922.
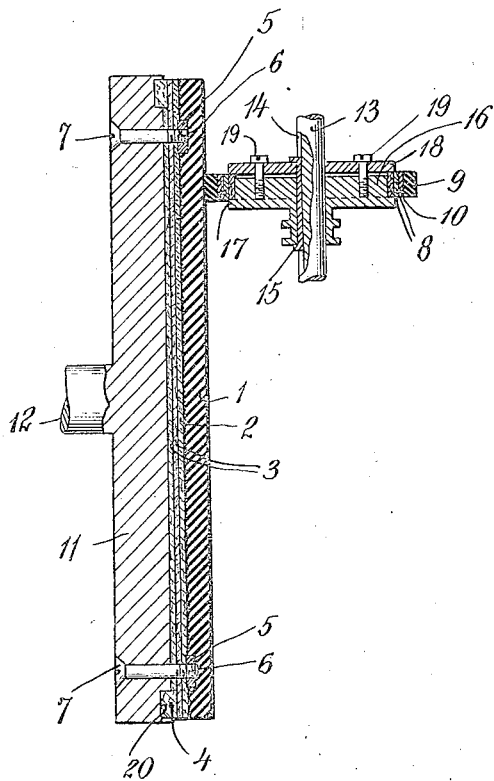
Inventor
Henry C Egerton
By his Attorney
Harry L Duncan

UNITED STATES PATENT OFFICE.

HENRY C. EGERTON, OF RIDGEWOOD, NEW JERSEY.

FRICTION-DRIVING DEVICE.

1,422,550.　　　　　Specification of Letters Patent.　Patented July 11, 1922.

Application filed October 15, 1918. Serial No. 258,276.

*To all whom it may concern:*

Be it known that I, HENRY C. EGERTON, a citizen of the United States, and resident of Ridgewood, county of Bergen and State of New Jersey, have made a certain new and useful Invention Relating to Friction-Driving Devices, of which the following is a specification, taken in connection with the accompanying drawing.

This invention relates especially to friction driving devices which may be of the variable speed type and in which one or more of the different driving elements which may be of any suitable construction may be formed with replaceable facing members having vulcanized rubber faces, if desired. These facing elements are preferably formed with stiffened body portions or members having fabric or other fibrous material carrying and preferably thoroughly impregnated with cured phenolic condensation cementing material and, if desired, projecting aligning portions of similar composition may be formed on the stiffened body to facilitate connection with the element on which the facing member is mounted. In some cases the driving face may be composed of such cured impregnated fibrous material in which any desired friction or wearing elements are incorporated and during the molding and curing this material may of course be given an accurately shaped smooth surface. A vulcanized rubber facing member may, if desired, be securely and permanently connected to such a stiffened body in various ways, as by an interposed connector member of fabric having a frictioned or other rubberized coating engaging the vulcanized rubber facing and securely united thereto and cemented to the stiffened body when these parts are vulcanized and cured under pressure at the desired heat. Nuts, plates or other securing devices may be incorporated in the stiffened body or other parts of the facing member which may be in disk, ring or conical form to suit the cooperating element of the driving device. The accompanying drawing shows in a somewhat diagrammatic way an illustrative embodiment of this invention in section, parts being shown in elevation.

The friction driving device may as indicated, have a driving disk 11 mounted on the shaft 12 and formed with suitable aligning openings 20 in the disk, to facilitate the alignment and securing of the replaceable facing member thereon. This facing member may advantageously comprise a stiffened body portion formed of one or more layers of fabric such as heavy canvas or other woven or knit fabric, open textured paper or other fibrous material carrying and preferably quite thoroughly impregnated with cured phenolic condensation cementing material such as bakelite, condensite or redmanol varnish compositions. Heavy canvas may for instance, be impregnated with bakelite varnish No. 1 and then dried and several layers cemented together under moderate heat, and such special portions or projections as the projecting aligning portions 4 formed by inserting in a suitably shaped mold additional layers or cut portions of canvas or other fabric or fibrous material containing such cementing compositions. Some thirty to sixty per cent of such cured phenolic condensation cementing material may be present in the completed stiffened body, which may thus be given a strength of between ten thousand and twenty thousand pounds per square inch. Such a facing member may be accurately molded and may advantageously be used in some cases as a replaceable member in connection with a rubber faced or other cooperating member of the friction driving device.

Where a vulcanized rubber face is desired on the facing member, however, the disk 1 of any suitable vulcanizable rubber composition may be forced against the stiffened body fabric and united thereto under pressure by heating the mold and elements therein to temperatures of 250 to 320° F. for an hour more or less. This vulcanizes the rubber and cures or solidifies the phenolic condensation cementing material and unites all the parts, the rubber being forced sufficiently into the pores or interstices of the fabric so as to be securely united thereto. If desired, however, a fabric connector layer 2 of light canvas or other fabric having a frictioned or other rubberized coating 21 thereon may be interposed between the rubber disk facing and the stiffened body before the heat curing thereof so that the rubberized side of this connector engages the rubber facing and promotes the vulcanizing union thereof to the stiffened body, the cementing material of which engages and cements the connector layer thereto. If desired, threaded or other nuts or securing devices such as 5 may be incorporated in the facing member, preferably within or in contact with the stiffened body thereof and held in place by locating pins in the mold so as to be securely molded in the desired position within the facing member and adapted to be engaged by securing bolts such as 7 which may pass through holes in the driving disk 11.

The driving wheel 16 which may be slidably mounted on the shaft 13 and having the key 15 in the wheel, engaging the keyway 14 in the shaft may with advantage have a replaceable facing member mounted between the flange 17 of the wheel and the removable flange 18 thereof which may be screwed in place as by the nuts or screws 19. This facing member may comprise a plurality of layers of canvas or other fabric 8 carrying or impregnated with such phenolic condensation cementing material and a previously impregnated and dried strip of canvas may be softened by moderate heat and then wound a number of times around a mandrel or molding element of the desired size and a fabric connector member 10 having a rubberized outer surface may be wound on. A facing 9 of vulcanizable rubber or other suitable composition having any desired friction promoting elements therein may be applied and the whole vulcanized, cured and united in a mold under heat and pressure as previously described.

This invention has been described in connection with a number of illustrative embodiments, forms, proportions, elements, parts, shapes, materials, compositions, and methods of preparation, production and use, to the details of which disclosure the invention is not of course to be limited, since what is claimed as new and what is desired to be secured by Letters Patent is set forth in the appended claims.

I claim:

1. In friction driving devices, a drive member and a replaceable facing member therefor comprising a stiffened body having a plurality of layers of canvas carrying and impregnated with cured phenolic condensation cementing material, a vulcanized rubber facing secured to said stiffened body and a fabric connector interposed between said body and facing and securely united thereto, projecting aligning portions on said body containing fibrous material and carrying phenolic condensation cementing material cemented to said body, and threaded securing devices embedded in said facing member and cooperating with said stiffened body.

2. In friction driving devices, a drive member and a replaceable facing member therefor comprising a stiffened body having a plurality of layers of canvas carrying cured phenolic condensation cementing material, a vulcanized rubber facing secured to said stiffened body, projecting aligning portions on said body containing fibrous material and carrying phenolic condensation cementing material cemented to said body, and securing devices embedded in said facing member and cooperating with said stiffened body.

3. In friction driving devices, a drive member and a replaceable facing member therefor comprising a stiffened body having canvas carrying cured phenolic condensation cementing material, a vulcanized rubber facing secured to said stiffened body, and securing devices embedded in said facing member and cooperating with said stiffened body.

4. In friction driving devices, a drive member and a replaceable facing member therefor comprising a stiffened body having a plurality of layers of fabric carrying cured phenolic condensation cementing material, projecting aligning portions on said body containing fibrous material and carrying phenolic condensation cementing material cemented to said body, and threaded securing devices embedded in said facing member and cooperating with said stiffened body.

5. In friction driving devices, a drive member and a replaceable facing member therefor comprising a stiffened body having fabric carrying cured phenolic condensation cementing material, and threaded securing devices embedded in said facing member and cooperating with said stiffened body.

6. In friction driving devices, a drive member and a replaceable facing member therefor comprising a stiffened body having fabric carrying cured phenolic condensation cementing material, and a facing secured to said body and of different composition therefrom.

7. In friction driving devices, a drive member and a replaceable facing member therefor comprising a stiffened body containing fibrous material carrying and impregnated with cured phenolic condensation cementing material, a vulcanized rubber facing secured to said stiffened body and metallic securing devices embedded in said facing member and cooperating with said stiffened body.

8. In friction driving devices, a drive member and a replaceable facing member therefor comprising a stiffened body containing fibrous material carrying cured phenolic condensation cementing material and a vulcanized rubber facing secured to said stiffened body.

9. In friction driving devices, a replaceable facing member comprising a stiffened body having a plurality of layers of fibrous material carrying cured phenolic condensation cementing material and a rubber composition facing secured to said stiffened body.

10. In friction driving devices, a facing member comprising a stiffened body having fibrous material carrying cured phenolic condensation cementing material and a diverse composition facing secured to said stiffened body.

11. In friction driving devices, a replaceable facing member comprising a stiffened body having fibrous material carrying cured phenolic condensation cementing material and threaded metallic securing devices embedded in said facing member and cooperating with said stiffened body.

12. In friction driving devices, a facing member comprising a stiffened body having fibrous material carrying cured phenolic condensation cementing material and metallic securing devices embedded in said facing member and cooperating with said stiffened body.

13. In friction driving devices a replaceable facing member comprising a shaped stiffened body formed with projecting aligning portions and having fibrous material carrying cured phenolic condensation cementing material.

14. In friction driving devices, a replaceable facing member comprising a shaped stiffened body having fibrous material carrying cured phenolic condensation cementing material.

HENRY C. EGERTON.